United States Patent [19]

Melis et al.

[11] 4,298,793
[45] Nov. 3, 1981

[54] PORTABLE ELEMENT FOR RECEIVING, STORING, DISPLAYING AND OUTPUTTING DIGITAL DATA, AND A RESERVATION DEVICE FOR USE IN A RESERVATION SYSTEM

[75] Inventors: Johannes H. A. M. Melis; Willem Le Mair, both of Eindhoven, Netherlands

[73] Assignee: U.S. Philips Corporation, New York, N.Y.

[21] Appl. No.: 10,879

[22] Filed: Feb. 9, 1979

[30] Foreign Application Priority Data

Feb. 27, 1978 [NL] Netherlands ................. 7802132

[51] Int. Cl.³ ............ G06K 19/06; G06K 19/02; G09F 9/30; G06F 15/02
[52] U.S. Cl. ................... 235/487; 235/488; 235/492; 340/712; 364/705
[58] Field of Search ............ 235/375, 380, 381, 384, 235/493, 492, 487, 439; 360/131, 2; 340/149 A, 311, 365 R, 712; 364/705, 709, 900

[56] References Cited

U.S. PATENT DOCUMENTS

| | | | |
|---|---|---|---|
| 3,868,057 | 2/1975 | Chavez | 235/492 |
| 3,906,460 | 9/1975 | Halpern | 364/900 |
| 3,934,122 | 1/1976 | Riccitelli | 235/492 |
| 3,978,320 | 8/1976 | McBride | 235/493 |
| 4,001,550 | 1/1977 | Schatz | 235/487 |
| 4,007,355 | 2/1977 | Moreno | 235/492 |
| 4,032,931 | 6/1977 | Haker | 340/712 |
| 4,092,524 | 5/1978 | Moreno | 235/487 |
| 4,105,156 | 8/1978 | Dethloff | 235/492 |
| 4,152,768 | 5/1979 | Kuriya | 364/705 |
| 4,157,588 | 6/1979 | Ebihara | 364/705 |

*Primary Examiner*—Robert M. Kilgore
*Attorney, Agent, or Firm*—Thomas A. Briody; Robert T. Mayer; James J. Cannon, Jr.

[57] ABSTRACT

A portable element shaped as a card, for receiving, storing, displaying and outputting data in numerical or alphanumerical characters, for temporarily communicating with a locally present reservation system and to exchange data therewith. The reservation system communicates with a service facility which is not locally present such as a transport vehicle. On the basis of an actual or forecast staus of the service facility, reservation data are applied to the portable element, and are displayed thereon, and also applied to the service facility. The contactless communication between portable element and reservation device can be initiated by a proximity signal.

16 Claims, 14 Drawing Figures

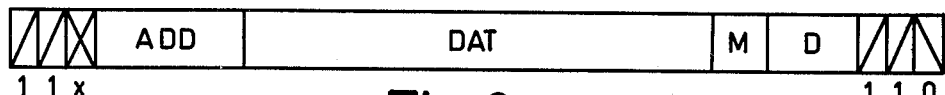
Fig.6
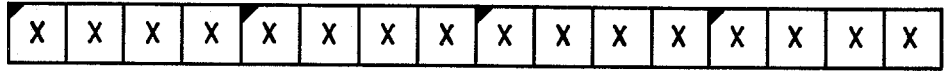
Fig.7a
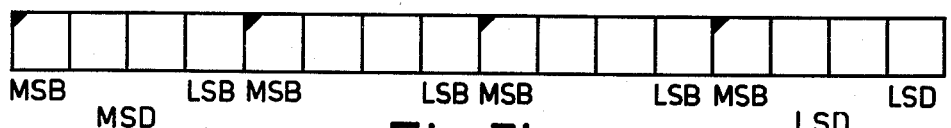
Fig.7b
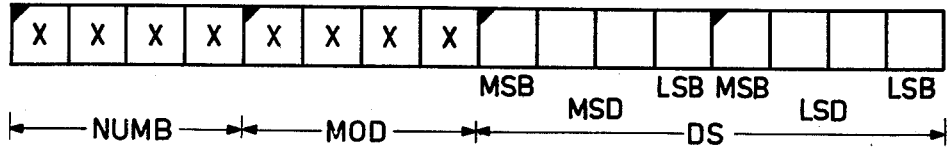
Fig.7c
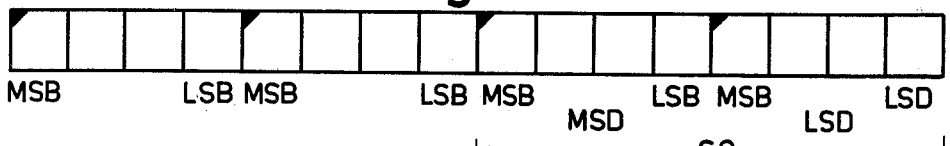
Fig.7d
```
-0  1   ERDT      1 1 1   HLD
 0  0   WRDT      0 0 1   WRSQ
 1  0   RDDT      0 1 0   WRDS
 1  1   KPDT      0 1 1   WRSQERDS
                  1 0 0   WRDSERSQ
   Fig.8a         1 0 1   ERSQ
                  1 1 0   ERDS
                  0 0 0   ERSQERDS
                       Fig.8b
```

PORTABLE ELEMENT FOR RECEIVING, STORING, DISPLAYING AND OUTPUTTING DIGITAL DATA, AND A RESERVATION DEVICE FOR USE IN A RESERVATION SYSTEM

BACKGROUND OF THE INVENTION

1. Field of the Invention

The invention in general relates to a reservation system, for a system including one or more service facilities. An example of such a service facility is a circulating vehicle. A reservation system of this kind furthermore includes a reservation device, for example, a terminal. Access to the terminal can be realized in different manners, for example, by way of a public telephone. A reservation system of this kind provides a given service to users according to some form of stategy, for example, one for optimum use of the capacity of the service facility (facilities).

The invention in detail concerns a portable element for receiving, storing, displaying and outputting digital data, comprising a data input, a memory having an at least partially modifiable content, a display device for the persistent display of digital data in the form of characters on the basis of data received on the data input, and a data output.

2. Description of the Prior Art

An element of this kind is known per se from U.S. Pat. No. 3,978,320. The known device comprises a plastic card on which there is provided a magnetizable strip and an electrochromic display device providing a persistent display. The known device operates as an updating device for a stock list, for example, in a warehouse.

The invention aims to provide a portable element which corresponds to the known element in given respects but which has been improved in order to enable its use in a reservation system.

The objects of the invention are achieved in that, when used in a reservation system comprising at least one locally present reservation device and at least one service facility which is not locally present, said data input and data output are suitable for coupling to an access device of the reservation device, and for then receiving a proximity signal from the reservation device, said memory being suitable to transmit, co-controlled by said proximity signal, identification data stored in said memory and a reservation request concerning the service facility to the reservation device in order to grant the reservation request, unblocking being realized by a verification signal generated by said identification data after examination thereof in the reservation device, the display device being suitable to display, under the control of the content of the memory modified by a signal of availability data from the reservation device, the reservation data concerning a reservation of a service facility, the availability data in the reservation device being adapted at the same time. The initiation of a possibly rudimentary, i.e. not yet specified, reservation request thus takes place from the portable element as an active device. Such a rudimentary reservation request may be embodied, for example, in a set/reset flag bit, or even in a permanently wired bit position.

The treatment of the reservation request can be started together with said proximity signal from the reservation device (this may also concern one bit position). Contrary to the foregoing, the known element was active only in a slave mode. As a result of the persistently displayed reservation data, the bearer (holder) of the element can continuously inform himself as regards the reservation, if desired. Furthermore, the reservation is now coupled to the portable element: the quantity of the reservation, therefore, cannot be larger than embodied in the logic structure of this portable element. For example, it is now possible that each portable element can reserve only one or two seats in said vehicle. As a result, jamming of the reservation system can be prevented, which could occur if an unlimited number of reservations (possibly fraudulent) could be executed. On the other hand, a single reservation request may also concern a large number of seats when the reservation system has a so-called "taxi mode", whereby a complete vehicle is reserved. Large groups can thus receive faster service. The identification data can be used for updating a balance, for example, a credit balance or statistics concerning the use of the service facility. Other possible uses concern the granting of priority to given requests for reservation, or the exclusion of other persons making a request, for example, when the card has been stolen. The persistent display can make the portable element suitable as an admission card when the service facility is subject to human supervision. The persistent display can also indicate a choice to be made by the bearer, for example, when a plurality of service facilities are simultaneously or successively present. Finally, the display of the portable element may indicate that reservation is not possible. The service facility is not locally present. This implies that the intermediate step between user and the service facility by way of a reservation device offers advantages, because the planning efficiency can be enhanced. The distance between user and service facility itself may be comparatively small, for example, 25 meters when the service facility comprises a number of luggage vaults.

U.S. Pat. No. 3,906,460 describes an active, portable element for use in combination with an available system, for example, a public transport means. It can alternatively be used as a credit card. The known element notably contains variable data such as a credit balance (for example, expressed as an amount of money or a (permissible) distance yet to be traveled). Special steps are taken therein to prevent frauds. Consequently, the known device does not concern a reservation system and, therefore, the display device thereof is only suitable for the display of a few "OK" signals as regards a credit balance stored in the portable element and also as regards attempts of unauthorized persons to gain access to the system. The known device thus concerns a payment system and not a reservation system. If desired, a payment system of this kind can also be incorporated as an additional function in a portable element in accordance with the present invention.

SUMMARY OF THE INVENTION

Preferably, the portable element comprises an inductive loop device for the contactless receiving of an energy pattern which is locally built up by the reservation device and which serves to power circuit components of the portable element, including the display device which persistently displays for at least a predetermined period of time when the portable element is uncoupled from the reservation device, and also to enable bidirectional data traffic in order to realize the coupling between said data input and data output on the one side and said access device on the other side. A very robust connection is thus realized: it is no longer necessary to provide mechanical contact points which could, intentionally or not, be damaged in public traffic. After removal of the portable element from the locally generated energy pattern of the reservation device, the display is persistent for some time, for example, an hour, in order to indicate the state of the reservation for the user. Powering by a battery or another device is then superfluous: the portable element may be constructed to be fully closed and, after having been out of use, it need not be recharged before renewed use is possible. However, in given applications battery powering may be preferable. In that case the inductive loop device may serve, for example exclusively, for data transfer. The transfer of digital (and/or analog) data in two directions enables a given degree of dialog between the portable element and the reservation device, for example, for dealing with a reservation request in an iterative manner.

Preferably, the portable element also incorporates a keyboard having a code output which is connected to the data output of the portable element in order to selectively apply a reservation request thereto. This constitutes an attractive extension, because the holder, for example, can make a selection from a number of feasible reservation requests or a reservation request can be replaced by another request, for example, when a first reservation request has not been granted. A further advantage of such an embodiment consists in that the rather vulnerable control members are arranged on the portable element rather than on the reservation device where they are readily subject to willful damage.

Preferably, the portable element also incorporates a keyboard having a code output which is connected to an input of a memory which is also incorporated in the portable element. In that case selective storage of data in the memory is possible, or given data can be retrieved from the memory. This makes the communication more flexible.

Preferably, between said data input and data output there is loop-wise connected a shift register which can be activated by a clock element of the portable element and which serves to apply data received on said data input to said data output in order to form a presence signal. When the clock is started, a closed loop is thus automatically formed which can be readily detected by the reservation device, the portable element thus signalling its own presence to the reservation device. The formation of such a data transfer loop by way of a shift register may be effected by parallel or series connection. The data can be returned in unmodified form, but also in modified form, for example, by inversion or by addition of a signalling bit.

The invention also relates to a reservation device which is suitable for communicating with such a portable element, the access then comprising a second data output which is connected to an output of a bit pattern generator, and a second data input which is connected to an input of a bit pattern detector, said bit pattern detector being adapted to generate a presence detection signal under the control of a received bit pattern which is related to a previously transmitted bit pattern. Notably in the case of juxtaposition of portable element and reservation device, a functional diad is thus obtained which enables ready starting of a question/answer situation.

Furthermore, a decoder which is connected to predetermined bit positions of the shift register preferably acts as a control device for further components of the portable element. In reaction to the reception of given bit patterns transmitted after the signalling of the presence of the portable element by the reservation device, the operation of the portable element is thus controlled, for example, as regards the display of given new data. This signalling will often take place in two levels: a predetermined number of bits signals that no relevant bit pattern is present in the shift register, while a further predetermined number of bits controls a selective function only under the control of said signalling.

Preferably, an unblocking device is connected between further predetermined positions of said shift register and a data connection of said memory, a control input of the unblocking device being connected to a control output of said decoder for the selective conducting of a data transfer. Thus, new data are applied without difficulty to the memory and hence to the display device.

Preferably, said unblocking device can be activated in two directions by relevant signals on a control output of said decoder. Thus, data can also be readily applied from the memory to the reservation device.

Preferably, said inductive loop device comprises at least one first loop element for receiving power energy, a second loop element for receiving data energy, and also a third loop element for transmitting data energy. This results in an attractive separation of the data transfers in both directions and of the power transfer. On the other hand, this separation can be omitted for the sake of simplicity in given cases.

Preferably, the display device is suitable for the display of an identification of a service facility. This produces an attractive indication for the user and, moreover, can be advantageously used as an indication for third parties, such as the operating personnel of the service facility. Similarly, the display device is preferably adapted to display data of a permissible reservation request.

The described reservation device is preferably provided with an element for the display of further digital data concerning the internal status of the reservation system. The possibilities for display on the portable element are thus supplemented. This supplement may consist of a single "active", "OK", or "error" indication. In a more complex form, it may be a numerical or alphanumerical display having a capacity of one or a few characters, for example, for additionally or only temporarily required data. It may also concern a video display tube or a flat display element on which a number of lines of a plurality of characters can be accommodated. A dialog is thus possible.

Preferably, said reservation device comprises at least one key element for the selective introduction of a signal state into the reservation system. This enables the selective introduction of further information into the system, besides the data introduced into the system by the portable element. The advantage exists mainly when the portable element itself does not have a key facility. Said facility may comprise on the one hand a single "warning"- or "O.K."- key, but also, for example, a numerical keyboard similar to that of a telephone set.

Preferably, said reservation device comprises an audio indicator for signalling an internal signal state in the reservation system. This may concern a buzzer or a device for reproducing speech, for example, a standard message. The communication is thus improved.

Preferably, said reservation device comprises a microphone for receiving a speech signal. The communication is thus rendered more flexible.

BRIEF DESCRIPTION OF THE DRAWINGS

The invention will be described in detail hereinafter with reference to the accompanying diagrammatic drawings.

FIG. 6 shows the composition of a data word.

FIGS. 7a–d, show the composition of some memory words.

FIGS. 8a, b show tables concerning the control bits.

DESCRIPTION OF THE PREFERRED EMBODIMENT

Figure 1:
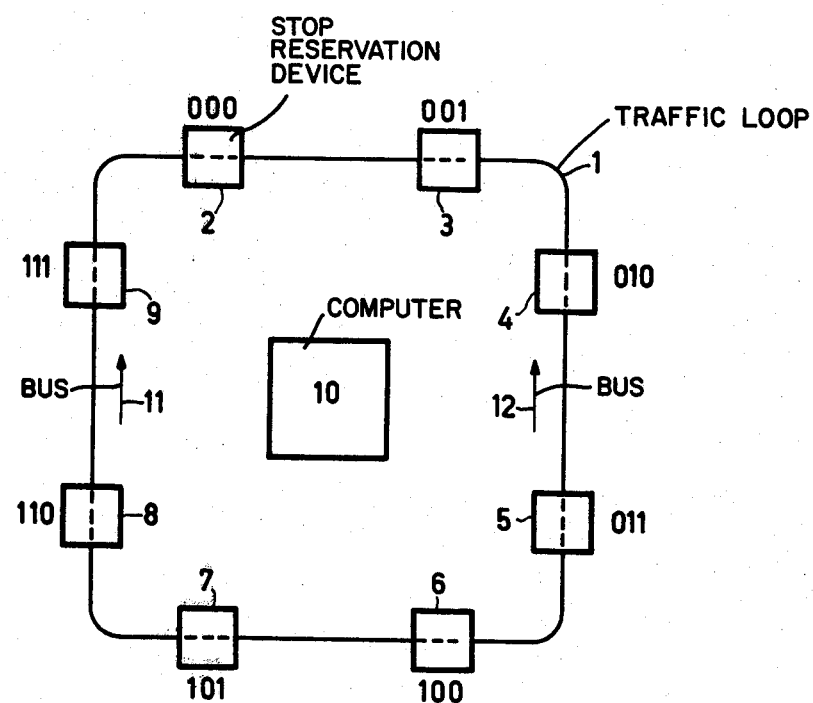
FIG. 1 shows a first environment in which the invention can be advantageously used.

FIG. 1 shows a first environment in which the invention can be advantageously used. This figure shows a traffic loop 1, for example, a perimeter road in a city, comprising eight stops 2–9, a reservation device being situated at each stop. Also shown are a central computer 10 and two omnibuses 11, 12, which are denoted only by arrows and which circulate in opposite directions. Each of the two buses thus forms a service facility each having a predetermined capacity (for example: number of seats). In this respect, the system shown in FIG. 1 has for its object to provide suitable adaptation to the traffic demand considering the available transport capacity (in passenger kilometers per unit of time). Each of the prospective passengers has his own portable element in accordance with the invention. Such an element may comprise a device enabling data to be introduced, for example, a keyboard, but this is not absolutely necessary. Upon arrival at a stop, the future passenger presents the access element to the local reservation device, for example, by arranging it thereon in the correct position. When this is correctly effected, the access element provides an indication thereof which also indicates whether the identification data in the access element (for example, a subscriber number which is first transmitted to the reservation device for checking) is permissible. This approval information is generated by the reservation device and is applied to the access element. The indication thereof is, for example, an O.K. lamp which may alternatively be present on the reservation device. If the identification information is not permissible (access element not valid), no O.K. indication appears and (see later) a spoken standard message can be generated by the reservation device. No O.K. indication appears either when the reservation system is inactive, and in these cases the process is terminated. When an O.K. indication appears, the passenger punches in the desired destination, for example, a stop number. The reservation request is then applied to the central computer 10 which may possibly be in contact with the buses 11, 12 and thus has the following information available:

(a) where the buses are situated, for example, by using a known location determining system;

(b) how many passengers are present in each bus, for example, by detection of all incoming and outgoing passengers and by updating the relevant balance;

(c) how many passengers are waiting at the relevant stops and what their relevant destinations are; and (d) on the basis of its previous decisions, which passengers have been assigned to which bus.

In reaction to each new reservation request by an access element, the relevant reservation device first reads any still applicable reservation request from the relevant access element. When the two requests are identical (same passenger, same destination), nothing happens. If a non-identical reservation request by the same access element had already been granted and not yet executed, this request is invalidated in the memory of the system, data based thereon and still present being updated at the same time. Subsequently, the reservation request is first tested as regards permissibility, for example, whether the destination has a valid stop number. When the request is not valid, an indication is given, for example, by the flashing of the O.K. lamp. When the reservation request is valid, it is dealt with, the aim in this example being a minimum traveling time. It is to be noted that other criteria may also exist, for example, minimum waiting time. Assume that the buses have a capacity of eight passengers. The bus 11 (between the stops 8 and 9) still has four vacant seats. For example, a further passenger wishes to travel from stop 3 to stop 6. The computer then reduces the number of four passengers in the bus 11 by the number having the stops 9, 2 and 3 as their destination, and increases this number by the granted reservations from the stops 9, 2 and 3, 4, 5 to each of the stops 4, and so on such that an anticipated fill rate is known for each of the intervals between the pairs of stops 3/4, 4/5, 5/6. When the maximum of these fill rates is seven or less, the new reservation request may be granted. An indication of reservation is then given on the access element. This indication may concern the following:

(a) access element makes valid contact with reservation device (1 bit);

(b) reservation O.K. (1 bit);

(c) direction O.K. (1 bit);

(d) anticipated arrival time bus in minutes (2 digits).

Thus, if the reservation request cannot be granted, the computer tries whether a reservation in the other direction (by means of the bus 12) can be granted, i.e. via the stops 9, 8, 7. If this reservation request is permissible, it is granted. In that case, the indication (c) indicates the "wrong" direction. The computer can then also check whether the reservation request is permissible for the second passage of the bus 11 along the stop 2. The invention per se does not concern the algorithm of the reservation. The described system can be extended or modified in different manners. The indications (a) and (b) may be represented by a single bit. This bit may also be displayed on the terminal. Besides or instead of the indications (c) and (d), there may also be other indications, for example, the requested destination (in this case a digit suffices), the number of the bus or of a category of buses (line), in this case also one or more digits, the number of passengers to whom the reservation relates, the traveling mode (for example, rapid service, stop service, taxi mode, transfer data). The display may then be divided between the portable element and the terminal, the information elements which are relevent to the passenger for a more or less prolonged period of time then appearing on the portable element. Furthermore, there may be different roads on which the buses circulate. The algorithm may be different, in the case of different roads. In this respect, reference is made to the article by J. H. A. Melis, Aspects sur la conception et les characteristiques d'un systeme d'autobus fonctionnant a la Demande, Proc. Intern. Conf. Electronics+5, Paris 28/3-1/4-1977, pages 129-137. Furthermore, the optimizing of the supply with respect to the demand can be realized in many ways. For example, the production in passenger kilometers can be maximized, the overall travelling time can be minimized, or the total waiting time can be minimized, etc.

In a simpler system, the access element does not comprise a keyboard and the reservation is approved via an audio link with a central operator, the access element receiving the modified reservation information from the terminal for persistent display. Hybrid forms may also exist in that a keyboard as well as an audio link are provided. Part of or all keys may be situated on the terminal. After the passenger has boarded the bus, the access element can be used as a bus ticket to be shown to the driver (for example, without a further money transaction being required). It is alternatively possible for each bus to comprise its own peripheral apparatus whereto the portable access element is to be presented in the same way as previously to the reservation device. This can be done to correct the actual occupancy of the bus. This occupancy may deviate if a passenger does not behave in accordance with his reservation request. In some cases additional vacant seats may then occur. Presentation of the portable element to the peripheral apparatus of the bus may also be advantageous when the passengers leave the bus, for example, in order to generate a travel balance which is to be charged later.

Figure 2:
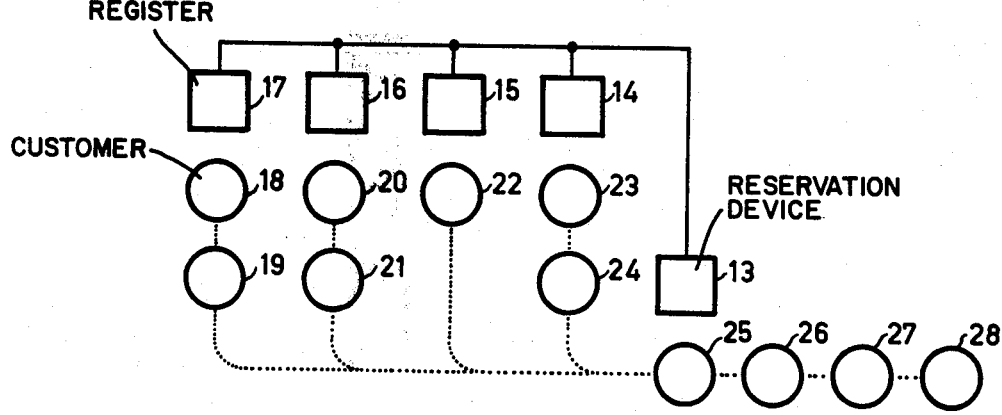
FIG. 2 shows a second environment in which the invention can be advantageously used.

FIG. 2 shows a second environment in which the invention can be advantageously used. This system comprises a reservation device 13 and four service facilities 14-17; in this example cash registers of a banking institution. In the situation shown in the figure, eleven customers 18-28 are involved in the system and have to be distributed among the cash registers as well as possible. When a customer presents his access element to the reservation device, he is given a cash register number, subject to the condition that at the most one customer or at the most a predetermined of customers are present at the relevant cash register; otherwise, a waiting situation occurs which terminates when the dealings with one or more of the customers at the windows have been completed. A waiting situation exists for the customers 25-28 in the figure. In other cases, the distribution of the customers between the windows may be independent of the number of customers waiting at these windows. so that no waiting situation is included. The cash register number appears on the display device of the access element. This number can, moreover, be displayed at the cash register itself, so that the relationship between the location of a cash register and its number need not be overly strict. If desired, the cash registers may communicate with the reservation device 13, so that the latter receives the information concerning the reduced length of the waiting times per cash register. Additional facilities can be created for special customers and corresponding different categories of windows. Moreover, given operations can already be performed; for example, the signature of the relevant customer can be retrieved from the central memory for comparison and be displayed on a display apparatus (this may take a brief period of time when the signature is centrally stored and the described banking facility has only intermittent access). Like in FIG. 1, further modifications are possible. The invention can also be utilized in environments other than the ones described. The service facilities may also be air-plane seats, washing machines in a laundry, luggage vaults, motel rooms, etc. One or more terminals may be present. The assignment strategy may be very different. However, the combination between portable element, the functions of receiving, storing, displaying and outputting digital data present therein is very advantageous in a reservation system as described.

Figure 3:
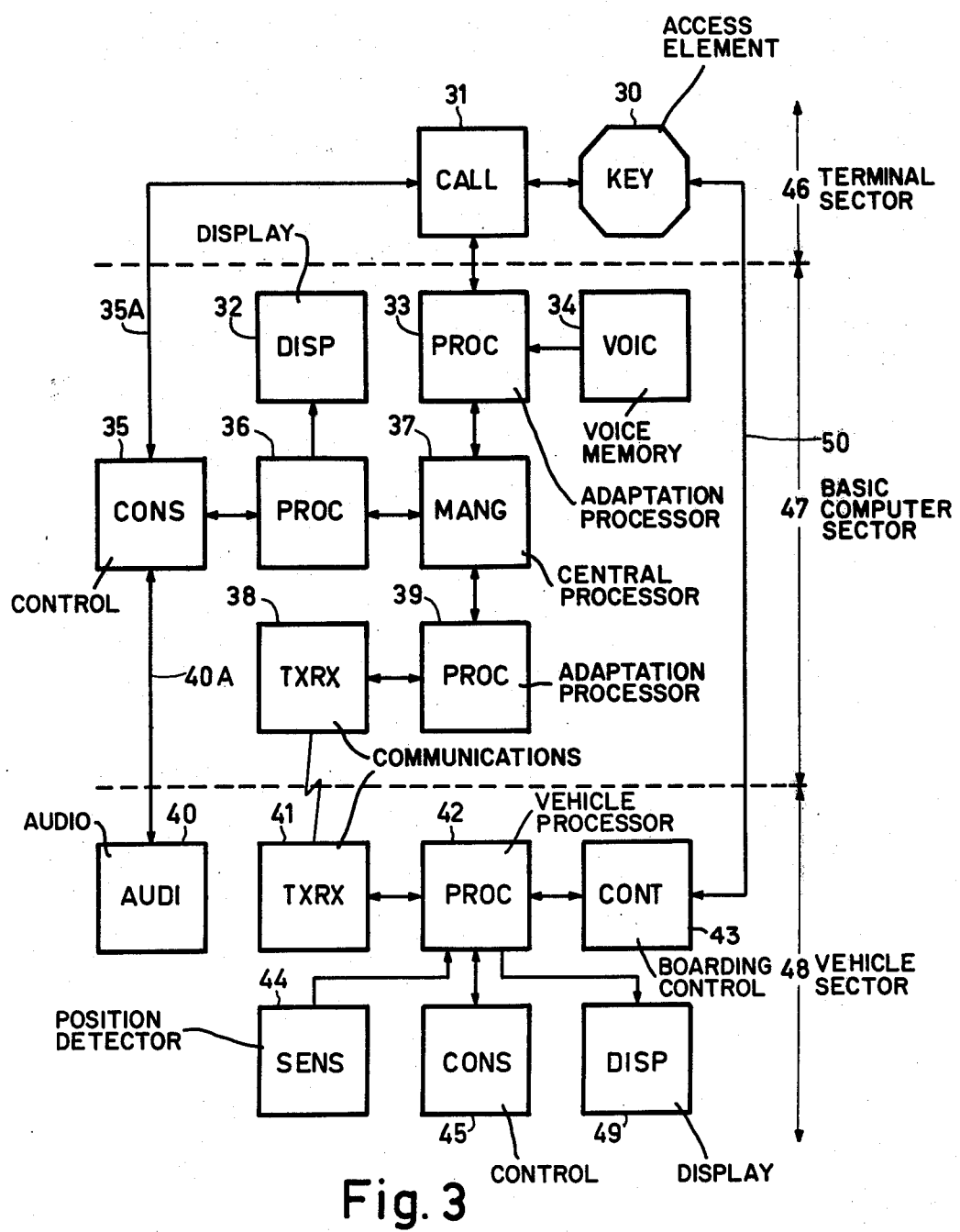
FIG. 3 shows a block diagram of a reservation system.

FIG. 3 shows a block diagram of a reservation system, notably for use in the environment of the system shown in FIG. 1. The system comprises the terminal sector 46, the basic sector 47 and the vehicle sector 48. The environment shown in FIG. 2 is less varied and can be realized by part of the components of FIG. 3. The terminal sector comprises the (removable) access element KEY (30) and the element CALL (31) which in this example exclusively establishes the contacts between the element KEY and the basic sector 47. In a more elaborate version, the element CALL may have a plurality of functions, such as supporting the described "O.K." or other indication lamps and one or more control buttons. The element CALL generates a local energy pattern in known manner, for example, by an inductively operating aerial whereby a proximity signal is internally generated in the access element 30, a power signal being applied to the access element by way of inductive transmission so that data signals can be transferred in both directions. This is possible, but need not necessarily be displayed on the portable access element by an indicator. Furthermore, in this embodiment the device 47 is suitable for operation by an operator. The operator has available a display apparatus (DISP) 32, for example, a video terminal, and a control apparatus (CONS) 35 which, for example, comprises a keyboard and a microphone/loudspeaker combination whereby contact can be established, via the line 35A (possibly wireless), between the element CALL and the control apparatus CONS. The system furthermore comprises a central management member (MANG) 37, being a processor of suitable capacity, for example, a minicomputer or an arrangement of microprocessors. This central management member communicates with the element 31 via the adaptation processor (PROC) 33. The voice memory VOIC (34) contains a number of standard messages. One of these messages may be that a number of previously submitted reservation requests are still being dealt with, so that no decision can be taken yet as regards the relevant reservation request. Another message may be that the identification information of the portable access element is not permissible. In the embodiment, the permissibility is independent of the holder of the portable access element (the passenger). If the identification is permissible, the acoustic connection with the device CONS is opened and a reservation request is verbally submitted by the passenger and introduced into the reservation system by the operator by way of a keyboard. The central management member grants or rejects the request by way of an algorithm implemented therein, and transmits an acceptation message to the element CALL, after which this message is displayed on the element KEY (possible also partly in the element CALL). If desired, an acoustic line may connect the operator and the passenger for a dialog. On the other hand, the element KEY may comprise a selection facility, for example, by way of a keyboard which is alphanumerical or not and whereby data can be applied to the system without intervention by the operator. In that case the facility for audio contact with the operator may be dispensed with.

In a more elaborate version, the voice memory contains data, coded or not, concerning the voices of permissible passengers, the passengers who may have access to the reservation system. In that case the adaptation processor 33 receives, for example, the identification code from the access element KEY and addresses a given voice code in the voice memory therewith. Subsequently, the voice sound received is processed in known manner and compared with the voice code fetched from the voice memory VOIC by the identification code. The management member receives a verified call signal only in the case of correspondence, and the reservation request is processed in the described manner.

The communication between the central management member MANG, the control apparatus CONS and the display apparatus DISP is provided by a further adaptation processor (PROC) 36; this contact is realised in a conventional manner. The calls, availability, etc. can thus be displayed. Decisions as regards the granting of the request can also be introduced into the control apparatus CONS by the operator. Furthermore, these decisions may concern general steps for system control, such as the introduction/withdrawal of material, change-over to a rush hour mode which is then controlled in detail by the management member MANG. The central management member MANG each time updates the data concerning the availability. As has already been stated, the terminal sector may be arranged to be remove from the basic sector 47, while the number of terminal sectors may be substantial. Communication with so many terminal sectors can be realized in known manner (by way of time multiplex of an interrupt organization). The elements 38 and 41 maintain a wireless connection between the basic sector 47 and the vehicle sector 48. This connection is wireless in this example. It is known per se to maintain intermittent contact with moving vehicles by way of communication loops in the road surface, i.e. each time a vehicle passes such a loop. The transmitter/receivers communicate with the central management member 37 via adaptation processor (PROC) 38. Furthermore, an audio connection exists, for example, in the 156 MHz band (40 A), via the element AUDI (40) which may be a known transmitter/receiver which is operated by the driver of the vehicle. The vehicle furthermore comprises a processor (PROC) 42 which has all further locally present elements as its peripheral apparatus, i.e. first of all the transmitter/receiver TXRX (41). There is also provided a display device DISP (49) which comprises, for example, a matrix of liquid crystals (LCD). In this example, the name of the next stop is displayed thereon in order to enable the vehicle to be routed along a route which has not been predetermined. This route can be adapted to reservation requests received at a later stage. The route is determined by the destinations of the boarded passengers, the requests of waiting passengers yet to be granted, and the progress of the route. The element 43 is a boarding control unit which supplies an approval signal to the processor 42 when confronted by the access element (line 50 which becomes active when the passenger presents his access element thereto upon boarding). The processor 42 sends the relevant boarding signalling to the management member MANG; if necessary, the latter updates the availability data, for example, when an expected passenger does not board. This may become apparent in the display on the element 49. On the other hand, the latter may also display a larger segment of the route to be followed.

The vehicle furthermore accommodates a simple control member CONS (45) whereby the bus driver, for example, can signal that he wishes audio contact with the control center or that the name of the next stop must be displayed. Finally, the vehicle accommodates a position detector SENS (44) which determines the position of the vehicle in known manner, for example, when it passes a locally present signal generator.

Figure 4A:
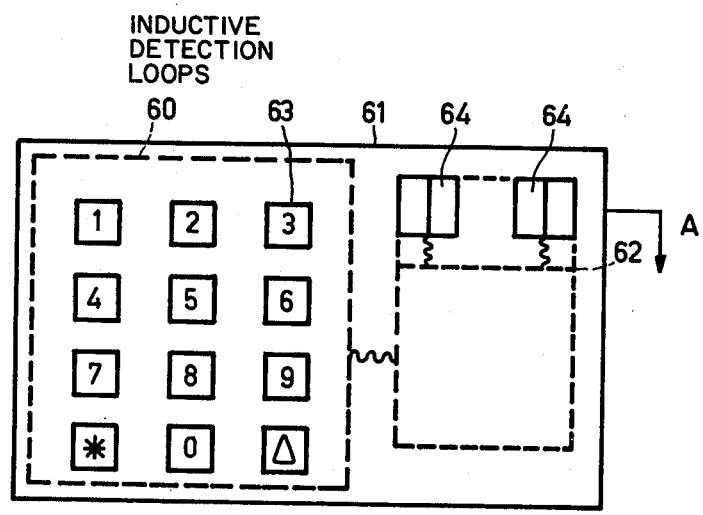
FIG. 4a is a front view of a portable element in accordance with the invention.

FIG. 4a is a view of a portable access element 61 at approximately the correct scale. The element is approximately card-shaped. If it does not comprise a keyboard, its thickness may be limited to, for example, 3 mm. If it does comprise a keyboard, its thickness is slightly larger, for example, approximately 6 mm. The element is manufactured using techniques which have become customary, for example, for the manufacture of pocket calculators, the individual electronic components being provided, for example, on a multilayer structure. The element 61 comprises a loop 60 which comprises a few turns and which is suitable for transmitting or receiving inductive field patterns, as will be explained hereinafter. The section 62 comprises the electronics connected thereto (see FIG. 5). Also provided is a keyboard 63, comprising ten digit keys and two function keys. Finally, there is provided a display device 64, comprising four seven-segment display units on which four digits can be displayed. The general directions for use are stated on the rear of the portable element. This information can also be provided on the element CALL of FIG. 3; the latter information may concern the codes of the various destinations possible. When the keys are used, the function keys may indicate a state "start" or "reset". The information can be displayed on the display elements in the described manner, i.e. a time of arrival, a bus number, a destination number and so on. Other facilities for the display device may also be attractive. On the one hand, the message to be displayed may contain more information as a result of a large number of characters. Alternatively, a plurality of messages may be successively displayed for a reservation, only the last message persisting as a result of corresponding control. In the case of audio contact with the operator, the keyboard in the element 61 may be dispensed with. In that case it is often advantageous for the element CALL of FIG. 3 to comprise one or more key elements. In a very simple system, key elements may sometimes be completely superfluous (see, for example, the system according to FIG. 2). In the case of a system according to FIG. 1, the first reservation information can first be displayed in the case of transfer (first sub-route), while the portable access element is presented to the element CONT (43) when the passenger leaves the bus, so that the data stored in the bus provide the display of the further sub-route. The electrical connections are symbolically denoted by meandered lines in FIG. 4a.

Figure 4B:
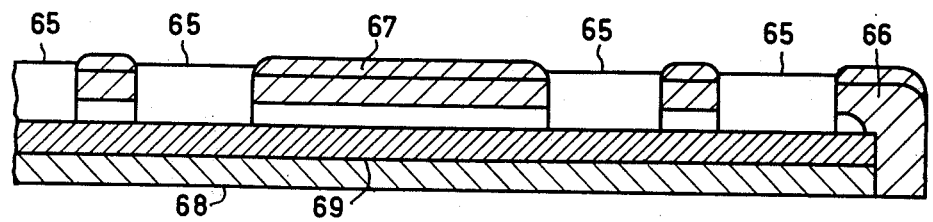
FIG. 4b is a sectional view of a portable element.

FIG. 4b is a cross-sectional view taken according to the arrow A in FIG. 4a. The figure shows the four seven-segment display elements 65 mounted on the plate 69. This plate comprises, for example, a multilayer printed wiring structure and is provided with integrated circuits (not shown) which perform the various functions. The assembly is accommodated in a housing of a synthetic material, comprising a front 67, a side 66 and a rear 68. The display elements are more or less situated in the same plane as the front of the housing. It will be obvious that the element may also be provided with computing circuits for performing arithmetic functions under the control of keys. The results thereof are then displayed on the elements 64/65. Obviously, this possibility does not exist if no keys are present.

Figure 5:
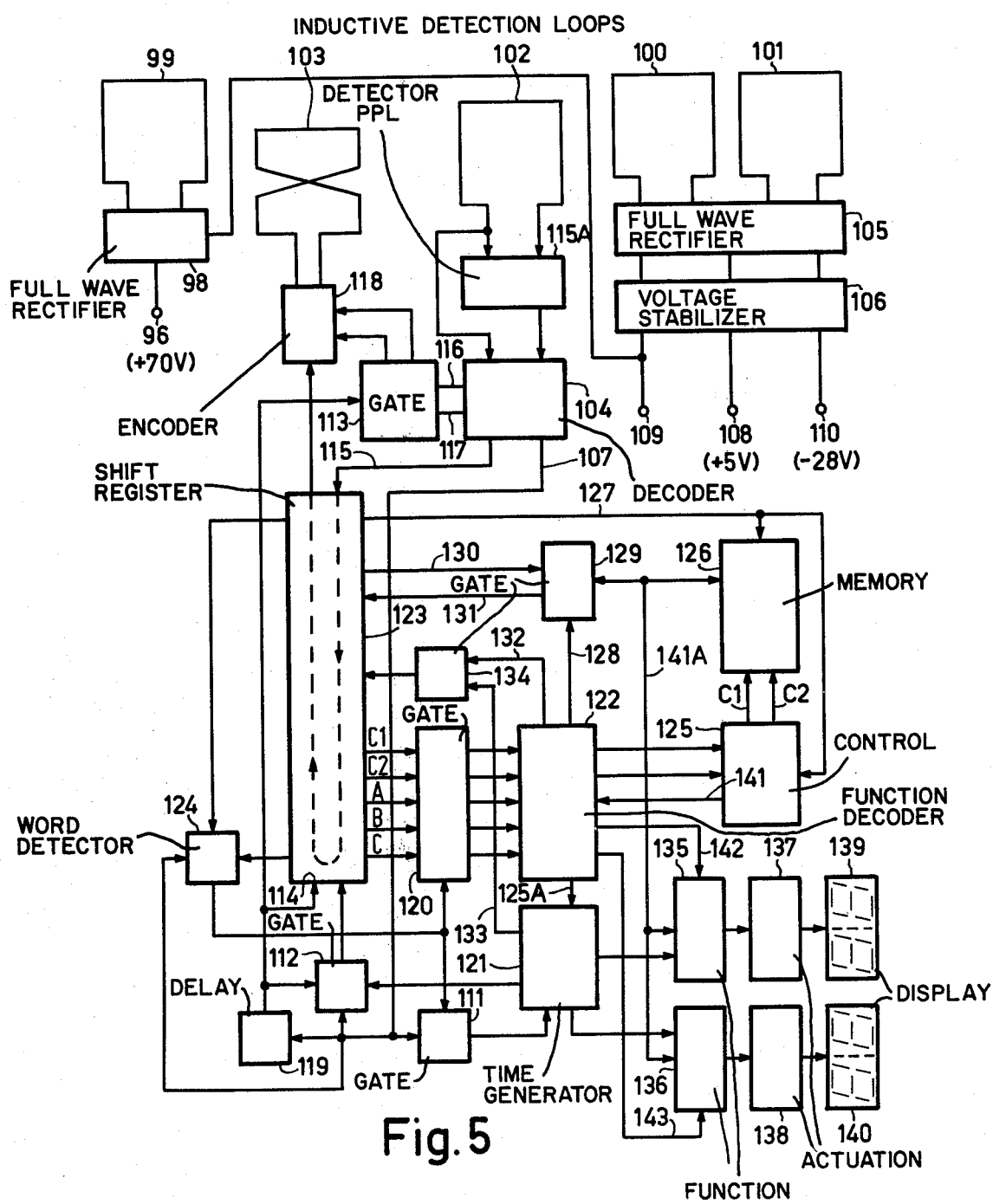
FIG. 5 shows a block diagram of the construction of a portable element.

FIG. 5 shows a block diagram of the construction of a portable element for use in the environment shown in FIG. 3, i.e. without keyboard or another selection device. There are five inductive detection loops 99, 100, 101, 102, 103, comprising 70, 10, 50, 10 and 1 turn, respectively. Together they are arranged in accordance with the indication 60 in FIG. 4a. As is shown, the loop 103 has a different winding pattern in order to achieve a higher insusceptibility to interference from the other loops. The transmission between the said loops and corresponding loops in the element CALL is favourable when they are spaced, for example, 2 to 6 mm apart in the case of an approximately corresponding and parallel position. The frequency of the signals used is, for example, in the range of 100 kHz. The loops are constructed as printed wiring, having a pitch of, for example, 0.2 mm between successive turns and a corresponding thickness. Only the thickness of the loop 103 is slightly larger, because this loop acts as a transmission loop and thus dissipates a comparatively large amount of energy. The loops 99, 100, 101 serve for power transfer to the portable element; they can be activated together by a single coil in the element CALL. The elements 98 and 105 are known full-wave rectifiers, the latter being constructed to be double for the loops 100, 101. The element 106 comprises a known voltage stabilizer. The following voltages appear on the terminals 96, 108, 109, 110 as a result of the actuation by the coil in the element CALL:

96: +70 volts for the display elements (non-stabilized);
108: +5 volts for a current consumption of 10 mA;
109: 0 volts
110: −28 volts for a current consumption of 10 mA, especially for powering the memory.

In the element 106 it is first checked whether the relevant powers are present, for example, by way of a threshold detector. If this condition is satisfied, the stabilized voltage is connected to the outputs. The further supply lines in the element KEY are not shown for the sake of brevity. If the supply voltages are too low, for example, due to incorrect positioning of the element KEY, nothing further happens. The loop 102 is suitable for receiving the information signal which is transmitted according to a known frequency modulated system, utilizing a fundamental frequency of approximately 100 kHz, a modulation depth of 10%, so approximately 10 kHz, and a bit rate in the range around 1 kHz. The element 115A is a detector for the frequency modulation and comprises a known phase-locked loop (PLL). The output signal thereof is applied, together with the signal of the loop 102, to the decoder 104 for the frequency modulated signal which generates a clock pulse series which is adapted to the bit rate and which has a recurrent frequency of approximately 2.5 kHz in this case. These data clock pulses are applied, via the line 107, to the delay element 119 and to the gate 111. During the delay time, the element 119, then blocks the gates 112 and 113 for the time being and resets the shift register 123, by way of the input 114, to the zero position in which it remains for the time being. Switching phenomena are thus bridged. The decoder 104 furthermore produces the data signals recovered from the input signal on the line 115 (however, nothing is stored in the shift register 123 for the time being), and also, alternately on the lines 116, 117, a dual clock pulse for the gate 113 which is still blocked for the time being. If the element KEY is not adequately positioned along the element CALL, contrary to the foregoing, the entire circuit remains in the rest condition. After a period of approximately 0.03 seconds, the delay time of the element 119 has expired and the gates 113 and 112 can conduct and the signal disappears on the reset input 114 of the shift register 123 which thus successively stores the data bits serially received on the input line 115. The shift register 123 has a capacity of 32 bits and, if nothing further happens, these bits are applied after some time, via the serial output of the shift register 123, to the data encoder 118 which is controlled by way of the dual clock pulses conducted via the gate 116, 117. The output of the data encoder 118 is connected, as shown, to the transmission loop 103: data bits can thus be returned to the element CALL. The element CALL comprises a power transmitter for activating the loops 99, 100, 101 and also an arrangement which corresponds to the elements 102, 103 in order to enable bits to be continuously transmitted and to detect the returned bits (if present). In practice, the information is then superimposed on the power signals transmitted by the element CALL.

The element 124 is a word detector which is connected to given bit positions of the shift register 123 in order to detect a 32-bit data word by way of a number of start/stop bits of predetermined value. When a data word (see hereinafter for the constellation thereof) is present in the shift register 123, it is detected by the word detector 124 one half clock pulse period later. The detection signal is applied to the gates 120 and 111. The gate 111 then conducts a clock pulse on the line 107 and starts the time generator 121. First of all, the time generator 121 supplies a signal to the gate 112, with the result that this gate is blocked again and the shift register 123 does not receive further data clock signals. The gate 112 can thus receive a blocking signal from the time generator 121 as well as from the delay element 119. The signal of the word detector 124 furthermore opens the gate 120 and the function decoder 122 thus receives the five bits C1, C2, A, B, C of the data word present in the shift register 123. First of all, the decoder 122 supplies a signal, via the line 125 A, to the time generator 121 in order to control the blocking time for the gate 112 to be generated therein. The signals of the bits C1, C2 are furthermore conducted to the control element 125 which can apply the signals of the bit C1, C2 to the memory 126. Depending on the value of the bits C1, C2, a read, erase, write or void memory operation can be performed in the memory 126 (see hereinafter). The control element 125, and also the memory 126, also receive, via the line 127, a five-bit address originating from five predetermined bit positions of the shift register 123. In the element 125, the address thus received is compared with one or more fixed address values which indicate protected addresses in the memory 126 at which only a read operation may be performed in order to apply the information to the shift register 123. Under the control of a correspondence signal between a received address and a stored address, a write operation or erase operation to be controlled by the bits C1, C2 for the memory 126 can be invalidated, for example, by the holding or modifying of one of the received bits C1, C2. On the other hand, the line 141 may return such a correspondence signal to the function decoder 122 in order to prevent the display (see hereinafter) of the information of such a protected address location. A protected address of the described kind can be stored in the form of fixed wiring by way of a logic gate, for example, the address (00000) by a logic NOR-gate which comprises five inputs which receive the relevant address bits. The output signal of said gate can control said blocking or modification, for example, by means of a further logic gate.

If communication is required between the memory 126 and the shift register 123, the gate 129 receives a control signal from the function decocer 122, via the line 128. The gate 129 is constructed as a so-called "tri-state buffer", comprising three positions: 1, 0 and "terminated by a high impedance", respectively. In the former two cases, this gate can conduct in both directions and the logic state is determined by an externally applied signal. The direction of the signal transfer is determined by relevant actuation of the shift register 123 or the memory 126. In the state "terminated by a high impedance", communication is possible, if desired, between the memory and the display device as will be described hereinafter. In the case of communication with the shift register, a read operation is performed therein via the line 130 or a write operation is performed therein via the line 131. All data paths from/to the gate 129 have a width of sixteen bits. When information is loaded into the shift register, the function decoder 122 supplies a signal on the line 132, while the gate 134 applies the loading signal (parallel loading) to the shift register 123 under the control of a signal from the time generator 121 on the line 133. The function of the memory 126 is controlled in accordance with the table given in FIG. 8a. These codes are: 01: erase word; 00: write word in memory from shift register; 10: read word from memory and write in shift register and/or the display elements (see later); 11: do nothing. The memory 126 is a read/write memory involving static storage and random access and has a capacity of 32 words of 16 bits each in this case (type ER2050, General Instrument).

The function decocer 122 is not only suitable for the described functions, but also for decoding the three bits A, B, C which operate in accordance with the diagram given in FIG. 8b in order to control the function of the display device. In this example, the display device comprises two function determining devices 135, 136, two actuation devices 137, 138, and two display elements 139, 140, each of which serves for two seven-segment characters. The information to be displayed appears on the sixteen-bit line 141A as two times an eight-bit code. In the elements 135, 136, this information is translated into two seven-segment codes. Furthermore, at the most one of the elements 135, 136 receives an actuation signal from the function decoder 122, via the line 142 or 143, respectively. The function decoder can add an alternating signal having a frequency of approximately 50 Hz and approximately 6000 Hz to the actuation signal. The function determining devices 135, 136 furthermore receive a selective signal from the time generator 121 in order to activate the display elements 139, 140 only during a predetermined time interval. In the foregoing, the frequency of 50 Hz is intended for writing, while the frequency of 6000 Hz serves for erasing. The actuation elements 137, 138 together provide impedance matching; as has already been stated, the power supply connections have been omitted for the sake of clarity. The display elements 139, 140 are based on the phenomena already described by G. H. Heilmeier and J. E. Goldmacher "A new electric-field-controlled reflective optical storage effect in mixed liquid crystal systems", Appl. Phys. L. 13 (1968), 132: a liquid crystal which in the stable state is ordered with a preferred direction parallel to the two flat walls wherebetween it is located, may also obtain a preferred direction perpendicularly to the plates. This concerns the "cholesteric" phase. The state involving the modified preferred direction is metastable with a decay time which is dependent of the configuration of the said plates and which ranges between a few minutes and a few hours. Thus, a persistent display can be maintained for this period of time without further energy supply. In order to achieve the present object, a holding time of, for example, 15 minutes is often sufficient, but a value of 1 hour is very well feasible in accordance with said article. In the environment shown in FIG. 3, the number of the omnibus is displayed on the element 139, while the code of the destination is displayed on the element 140. The information to be displayed is always applied also to the shift register 123 via the gate 129. The said voltage of 70 volts on the terminal 96 is used for activating the display elements, the frequency used (50, 6000 Hz) and the relevant actuation times being dependent of the mode of use. Some time is required for erasing the display.

After expiration of the time generated in the time generator 121, the blocking signal for the gate 112 disappears and the shift register 123 receives clock pulses again. As a result, the information in the shift register 123 is shifted further and the element 124 no longer detects the required combination of start and stop bits. Consequently, the gates 111 and 120 are blocked so that the control for the time generator 121 or the function decoder 122 ceases. The content of the shift register is thus shifted to the data encoder 118 and transmitted via the coil 103. A logic "1" is then represented by a transition at the positive edge of the odd and at the negative edge of the even clock pulse within a bitcell; a logic 0 is represented only by the latter.

In the memory/display system the main data flows exist from the shift register to the memory and/or the display device, and from the memory to the shift register and possibly the display device. Thus, the codes of FIG. 8b are: 111: display unmodified; 001: write bus number; 010: write destination number; 011: write bus number and erase destination number; 100: write destination number and erase bus number; 101: erase bus number; 110: erase destination number; 000: erase bus number, erase destination number.

FIG. 6 shows the composition of a data word at the instant at which it is detected by the detector 124, for which purpose notably the start bits and stop bits should have the correct value. The bits are numbered from 1 to 32. The bits 1 and 2 have the compulsory value "1" as a start bit. The bit 3 is a spare bit for a function yet to be specified, or may act as an additional start bit. The five bits 4 to 8 form the address for the memory 126. The bits 9–16 form data for the memory 126. The bits 17–24 form data for the memory 126 and/or the display device. The bits 25, 26 control, by way of the function decoder 122, the operating mode of the memory 126. The bits 27, 28, 29 control, also by way of the function decoder 122, the operating mode of the display device. These two sets of bits may thus have mutually independent values. The bits 30, 31 have the compulsory value "1" as a stop bit. The bit 32 as a further stop bit has the compulsory value "0". If said five start/stop bits have a different information pattern, no word is detected by the device 124, so that the shift register 123 constantly receives shift pulses via the gate 112. Data can in principle be applied to the shift register or the memory by way of an extension in the form of a keyboard.

Figure 9:
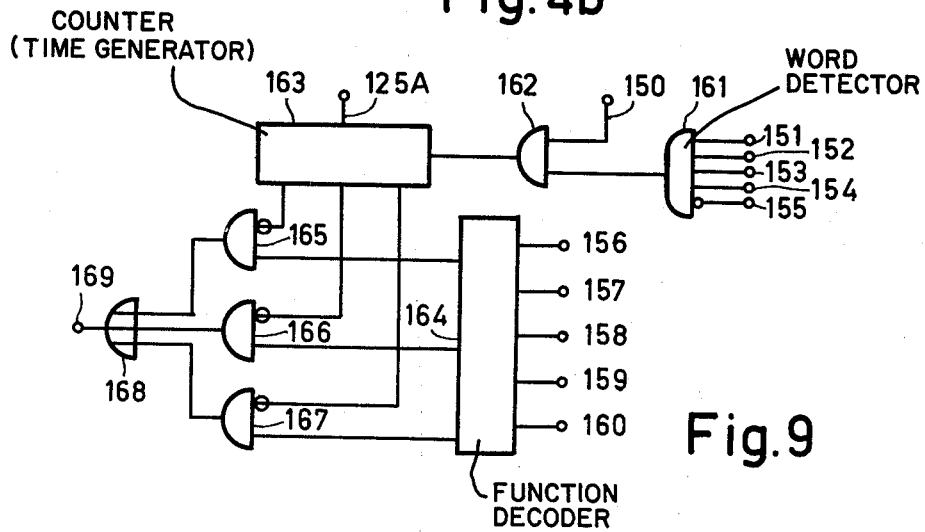
FIG. 9 shows a subsystem of FIG. 5, concerning the data clock.

FIG. 9 shows a sub-system of the arrangement shown in FIG. 5, notably concerning the time generator 121. On the input 150 (line 107 in FIG. 5), the data clock pulse appears with a frequency of 2500 Hz. On the inputs 151-155, the two start bits and three stop bits successsively appear. When the AND-gate 161 receives four logic ones and one logic zero (inverted input 155 which is denoted by a circle) in the correct succession, the gate 161 acts as the word detector 124 and unblocks the AND-tate 162 (gate 111 in FIG. 5). A signal on the line 125 sets the time generator 121 (i.e. the counter 163 in this case) to a predetermined position, for example, the position (000000). The counting input of the counter 163 receives the pulses from the gate 162 and divides this pulse series by 256. Furthermore, the counter comprises three output detectors for the values 1, 5 and 32; the outputs thereof are connected as shown to inputs of the relevant gates 165, 166, 167. Until the value (1, 5, 32) is reached, the relevant detector supplies a low signal (0). When the value is reached, the signal becomes logic "1", with the result that the AND-gate of the series 165, 166, 167 connected to this output is blocked by way of the inverted input. Thus, this takes place after approximately 0.1 seconds (256:2500), 0.5 seconds, and 3.3 seconds respectively. The function decoder 164 (120 in FIG. 5) receives the five function-determining bits (C1, C2, A, B, C) on the inputs 156-160, and supplies a logic "1" on at the most one of the outputs connected to the gates 165, 166, 167. Via the OR-gate 168, a signal of said length thus appears on the terminal 169, with the result that one of the display elements 139, 140 can be activated for the correct period of time or that the gate 134 can be made to conduct.

Subsequently, a communication procedure to be followed, for example, in a system in accordance with FIG. 3 will be described. All memory words for the memory 126 (FIG. 5) are coded in accordance with the BCD-system. Two predetermined addresses have been reserved for identification information concerning the passenger (2×16 bits). One further address has been reserved for the storage of the bus number. One further address has been reserved for the storage of the destination number, the number of passengers traveling together (on one portable element), and the mode of transport (normal, taxi mode, etc.). Before new information is written (in the memory as well as on the display elements), first the information present thus far is erased in this example. A basic property of the communication consists in that the element CALL, or the further system, first waits for a reply from the access element KEY (by way of the loop 103) before further changes take place. In the rest position, the element CALL continuously transmits a flow of "0" bits. When the element KEY is placed on the element CALL, this flow of "0" bits is ultimately returned via the loop 103 (after expiration of the delay for checking the supply voltage and after expiration of the delay time in the element 119). Re-reception in the element CALL of a series of 32 successive zero bits offers suitable initiation. As a result of the additional delay, switching phenomena are eliminated. These phenomena could occur, for example, when the element KEY is only slowly positioned: the total delay time incorporated is approximately 2 seconds. In this case, therefore, detection of a word is still impossible (see FIG. 6 for the word detection bits).

The element CALL comprises a detector for such a series of 32 "0" bits received. The output bits of this detector starts the procedure. First a so-called first data word is transmitted to the element KEY. After detection by the element 124, this first data word controls the reading of the first part (16 bits) of the identification information of the portable element and the writing thereof in the data field of the first data word. After expiration of the delay time of the element 121, in this case 100 ms, the modified data word is returned to the element CALL via the loop 103. In accordance with FIG. 7a, the data field of the first data word consists of sixteen bits of arbitrary value (x) in which said identification information is written. Subsequently, said first data word is again transmitted to the element KEY and provided with the identification information. This identification information is transmitted to the central station by the element CALL. After reception in the element CALL, or the system, the identity of the two data received is checked. If they are not identical, either the procedure may be repeated or a message from the voice memory VOIC can be transmitted. When the two words received are identical, the third and the fourth data word are transmitted in the same manner in order to fetch the second part of the identification information of the relevant memory address. If both sets have thus been found to be identical, the identification information is compared with a memory content in order to check whether the relevant identication information is permissible. If this information is not permissible, a relevant message in the voice memory is addressed and the procedure is terminated. If the information is permissible, the procedure is continued. The structure of the data field during retransmission is indicated in FIG. 7b, the most significant bit (MSB) and the least significant bit (LSB) being separately shown per tetrade, and also the most significant tetrade (MSD) and the least significant tetrade (LSD). During the described identity checks, the element CALL transmits the fifth data word to the element KEY. This word controls the memory address of the sequence number whih is erased. After a delay of 100 ms as described, the element KEY returns this fifth data word to the element CALL. In order to ensure that the relevant memory location is indeed erased, the element CALL transmits said fifth data word twice in succession.

After a positive identity check in the central station, the element CALL transmits the sixth data word to the element KEY. This sixth word is again directly repeated. Thereby, on element KEY, the memory word containing the destination number, the transfer mode and the number of co-passengers are erased. After a delay time of 100 ms, the element KEY returns the sixth data word to the element CALL. Subsequently, the element CALL transmits the seventh data word to the element KEY three times in succession, with the result that the destination number as well as the sequence number are erased on the display device. In this case, the element 121 generates the longest delay time, for example, approximately 3 seconds. Subsequently, the audio channel is opened if an operator is available. In the opposite case, a wait request is addressed in the voice memory. The prospective passenger states his destination, the number of fellow passengers and the transfer mode via the audio link. These data are applied to the element CALL via the data link and are transferred further to the element KEY as the eighth data word: they are then written in the associated memory location. In this case, the waiting interval amounts to 100 ms before the eighth data word is returned to the element CALL. The element CALL subsequently transmits the ninth data word to the element KEY. As a result, the data written for the eighth data word are read from the memory for checking and are returned to the element CALL after a delay of 100 ms. The returned data are then compared with the previously transmitted data. If they are not identical, the procedure is restarted from the sixth data word, or a message in the voice memory is addressed as an indication. The data field of last words has the structure shown in FIG. 7c, the destination number (DS) covering the two least significant digits or tetrades (D), the transport mode (MOD) covering the next-higher significant tetrade, and the number of passengers (NUMB) covering the most significant tetrade. If said identity is present, the tenth data word is transmitted to the element KEY. As a result, the destination number from the memory 126 is displayed in the part of the display device reserved for this purpose. In this case, the time delay introduced by the element 121 amounts to 0.5 seconds. Subsequently, the reservation request is dealt with and the algorithm incorporated in the system searches the sequence number (SQ) or bus-number to be assigned. This number is similarly processed: i.e. it is transmitted in the eleventh data word, checked in the twelfth data word, and displayed by the thirteenth data word. If the check does not produce the correct result, the procedure is restarted from the fifth data word, followed directly by the eleventh and the twelfth data word. The structure of the eleventh data word is shown in FIG. 7b: the bus number (SQ) is embodied in the two least-significant tetrades of the data field. After the thirteenth data word, the procedure has been completed, which can be signalled by the addressing of a relevant message in the voice memory. The element KEY may be removed without the display disappearing (for the time being).

The described procedure can be realized in a different manner within the scope of the invention. This is also applicable to the described embodiments of the element KEY, which may also be used in a different environment.

What is claimed is:

1. A portable element for receiving, storing, displaying and outputting digital data, said portable element having data input, a memory having an at least partly modifiable content, a display device for the persistent display of digital data in the form of characters on the basis of data received on the data input, and a data output, for use in a reservation system having at least one locally present reservation device and at least one service facility which is not locally present, characterized in that:
    means to couple said data input and data output for coupling to an access device of the reservation device and for then receiving a proximity signal from the reservation device;
    means to transmit, co-controlled by said proximity signal, identification data stored in said memory and a reservation request concerning the service facility to the reservation device in order to grant the reservation request;
    means to unblock said system by a verification signal generated by said identification data after examination thereof in the reservation device;
    said display device having means to display, under the control of the content of the memory modified by a signal of availability data from the reservation device, reservation data concerning a reservation of a service facility, the availability data in the reservation device being adapted at the same time.

2. A portable element as claimed in claim 1, characterized in that therein there is provided an inductive loop device for the contactless receiving of an energy pattern which is locally built up by the reservation device and which serves to power circuit components of the portable element, including the display device which persistently displays for at least a predetermined period of time when the portable element is uncoupled from the reservation device, and also to enable bidirectional data traffic in order to realize the coupling between said data input and data output on the one side and said access device on the other side.

3. A portable element as claimed in claim 1 or 2, characterized in that the portable element also incorporates a keyboard having a code output which is connected to the data output of the portable element in order to selectively apply a reservation request thereto.

4. A portable element as claimed in claim 1 or 2, characterized in that the portable element also incorporates a keyboard having a code output which is connected to an input of a memory which is also incorporated in the portable element.

5. A portable element as claimed in claim 1 or 2, characterized in that between said data input and data output there is loop-wise connected a shift register which can be activated by a clock element of the portable element and which serves to apply data received on said data input to said data output in order to form a presence signal.

6. A portable element as claimed in claim 5, characterized in that a decoder which is connected to predetermined bit positions of the shift register serves as a control device for further components of the portable element.

7. A portable element as claimed in claim 6, characterized in that between further predetermined positions of said shift register and a data connection of said memory there is connected an unblocking device, a control input of the unblocking device being connected to a control output of said decoder for the selective conducting of a data transport.

8. A portable element as claimed in claim 7, characterized in that said unblocking device can be activated in two directions by relevant signals on a control output of said decoder.

9. A portable element as claimed in claim 2, characterized in that said inductive loop device comprises at least one first loop element for receiving power energy and also a second loop element for receiving data energy, and a third loop element for transmitting data energy.

10. A portable element as claimed in claim 1, characterized in that the display device is suitable for the display of an identification of a service facility.

11. A portable element as claimed in claim 1, characterized in that the display device is suitable for the display of data of a permissible reservation request.

12. A reservation device which is suitable for communicating with a portable digital communication element as claimed in claim 5, characterized in that the access device comprises a second data output which is connected to an outut of a bit pattern generator, and a second data input which is connected to an input of a bit pattern detector, said bit pattern detector being adapted to generate a presence detection signal under the control of a received bit pattern which is related to a previously transmitted bit pattern.

13. A reservation device, suitable for communicating with a portable element as claimed in claims 12 or 2, characterized in that said reservation device comprises an element for the display of further digital data concerning an internal status of the reservation system.

14. A reservation device, suitable for communication with a portable element as claimed in claims 1 or 2, characterized in that said reservation device includes at least one key element for the selective introduction of a signal state into the reservation system.

15. A reservation device, suitable for communication with a portable element as claimed in claims 1 or 2, characterized in that said reservation device includes an audio indicator for signalling an internal signal state in the reservation system.

16. A reservation device, suitable for communication with a portable element as claimed in claims 1 or 2, characterized in that said reservation device includes a microphone for receiving a speech signal.

* * * * *

UNITED STATES PATENT AND TRADEMARK OFFICE
CERTIFICATE OF CORRECTION

PATENT NO. : 4,298,793

DATED : 11-03-81

INVENTOR(S) : Johannes H.A. M. Melis et al

It is certified that error appears in the above—identified patent and that said Letters Patent is hereby corrected as shown below:

On the title page inventors should read

-- Johannes H.A.M. Melis; Willem Le Mair, both of Eindhoven, and Gerrit Rademaker; Hilversum, Netherlands --.

Signed and Sealed this

Twenty-sixth Day of October 1982

[SEAL]

Attest:

Attesting Officer

GERALD J. MOSSINGHOFF

Commissioner of Patents and Trademarks